United States Patent [19]

Councilman

[11] Patent Number: 4,725,012

[45] Date of Patent: Feb. 16, 1988

[54] FISHING REEL DRAG WITH DUPLEX CONTROL

[75] Inventor: Richard R. Councilman, Collinsville, Okla.

[73] Assignee: Brunswick Corporation, Skokie, Ill.

[21] Appl. No.: 880,597

[22] Filed: Jun. 30, 1986

[51] Int. Cl.$^4$ ............................................. A01K 89/02
[52] U.S. Cl. ................................................ 242/84.5 A
[58] Field of Search ................ 242/84.2 R, 84.21 R, 242/84.5 R, 84.5 A, 84.51 R, 84.51 A, 217, 218, 219

[56]    References Cited
U.S. PATENT DOCUMENTS

| 2,329,381 | 9/1943 | Bannister | 242/218 |
|---|---|---|---|
| 3,184,179 | 5/1965 | Wood, Jr. | 242/217 |
| 4,509,705 | 4/1985 | Councilman et al. | 242/84.5 P |
| 4,516,741 | 5/1985 | Hashimoto | 242/217 |
| 4,555,072 | 11/1985 | Hitomi | 242/84.5 P |
| 4,572,448 | 2/1986 | Ban | 242/84.5 A |
| 4,591,108 | 5/1986 | Ban | 242/84.5 P |
| 4,601,437 | 7/1986 | Yoshikawa | 242/84.5 P |

FOREIGN PATENT DOCUMENTS 157714 10/1985 European Pat. Off. ....... 242/84.5 P

Primary Examiner—Billy S. Taylor
Attorney, Agent, or Firm—Wood, Dalton, Phillips, Mason & Rowe

[57] ABSTRACT

An improvement in a fishing reel of the type having a housing, a line-carrying spool which is rotatable upon line being drawn off the spool, a friction generating structure rotatable with the spool and drag applying structure for biasably engaging the friction generating structure to produce a drag force resisting rotation of the spool. A first drag actuating means is provided for movement in a first manner to adjustably increase bias of the drag applying structure against the friction generating structure at a first rate. Second drag actuating structure is provided for movement in a corresponding first manner to adjustably increase bias of the drag applying structure against the friction generating structure at a second rate, that is different than the first rate. The user can selectively operate the first and second drag actuating structure depending on the desired rate of drag change.

6 Claims, 7 Drawing Figures

FIG. 3
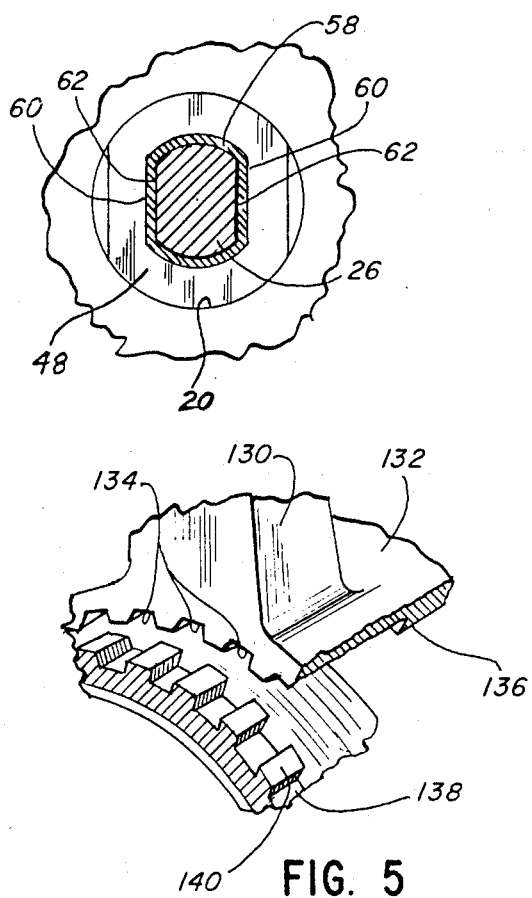
FIG. 5
FIG. 4
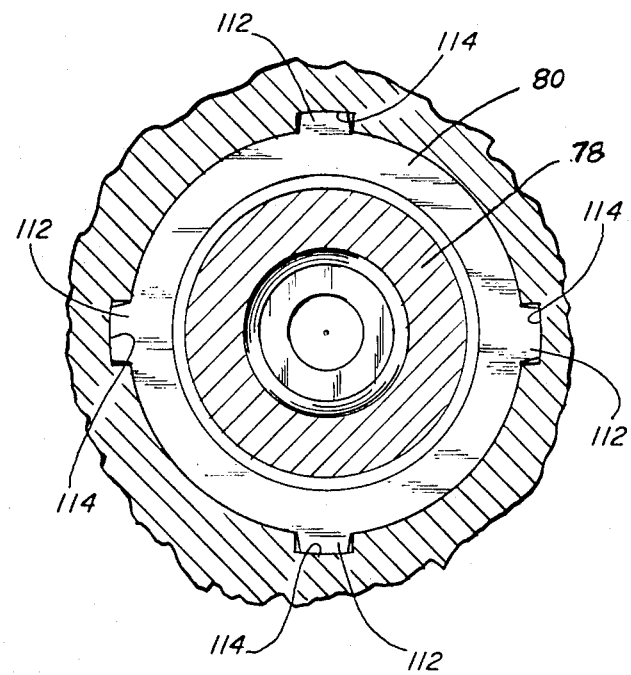
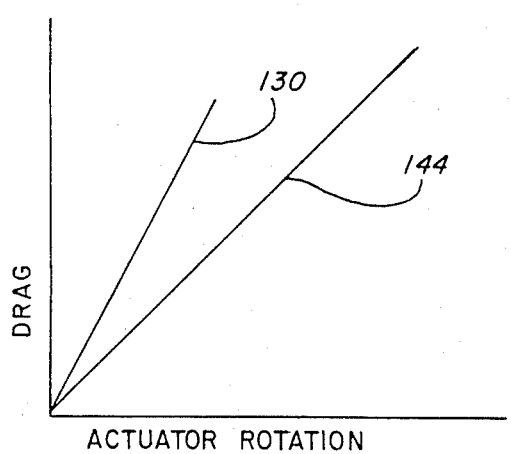
FIG. 6
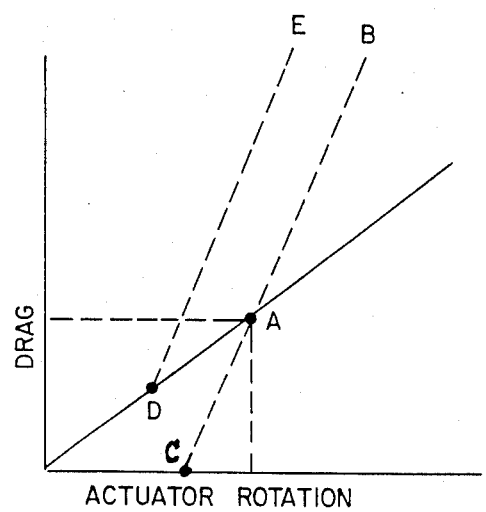
FIG. 7

FISHING REEL DRAG WITH DUPLEX CONTROL

BACKGROUND OF THE INVENTION

1. Field of the Invention

This invention relates to drag applying structure in fishing reels and, more particularly, to separate actuating structure that can be selectively used to vary the reel drag at different rates.

2. Description of the Prior Art

Adjustable drag applying mechanisms are incorporated into fishing reels to enhance the versatility thereof. Different drag settings may be appropriate for different types of fishing. It is also desirable to be able to change the drag setting on a reel once a fish has been hooked. To facilitate this, with, for example, a spinning style reel, a readily accessible drag knob may be incorporated at the rear extremity of the reel housing. By way of example, if a large fish is hooked, it may be necessary to quickly tighten the drag. To accomplish this, the user holds the pole in one hand and manually rotates the drag knob until a desired setting is achieved.

Designers of fishing reels have generally contended with two competing objectives. If a mechanism affords a high rate of drag change, making it suitable for adjustment as a fish is being reeled in, this is accomplished at the expense of giving up fine adjustment. On the other hand, fine adjustment of the drags makes it impractical for one to quickly adjust the drag setting once a fish has been hooked.

One proposed solution to this problem is shown in U.S. Pat. No. 4,572,448, to Ban. In Ban, separate drag assemblies are provided. At the rear of the reel, a rotatable knob is provided to effect adjustment. To rapidly increase the rate of drag, a spring-loaded locking member is provided for engagement with a second drag structure. One can rapidly actuate the locking structure, which at once increases the reel drag.

However, Ban does not adequately address the aforementioned problems. The Ban structure is either "on" or "off". One can in an instant increase the drag, however the increase may not produce an appropriate overall drag which is contributed to by both drag assemblies. If the drag produced by the locking member is too great, the knob might have to be backed off to set the desired drag force. If the locking structure is constructed so that only a minimal additional drag force is imparted, one must increase the drag through the drag knob at a low rate which may not meet the needs of the fisherman.

SUMMARY OF THE INVENTION

The present invention is specifically directed to overcoming the above problems in a novel and simple manner.

The invention is an improvement in a fishing reel of the type having a housing, a line-carrying spool which is rotatable upon line being drawn off of the spool with the reel in a retrieve mode, a friction generating structure rotatable with the spool and drag applying structure for biasably engaging the friction generating structure to produce a drag force resisting rotation of the spool.

According to the invention, a first drag actuating structure is provided for movement in a first manner to adjustably increase bias of the drag applying structure against the friction generating structure at a first rate. Second drag actuating structure is provided for movement in a corresponding first manner to adjustably increase bias of the drag applying structure against the friction generating structure at a second rate, that is different than the first rate.

The user can selectively operate the first and second drag actuating structure depending on the desired rate of drag change. The inventive structure affords all the advantages of the structure in Ban and is additionally more versatile.

The invention also contemplates the use of a single stack of drag washers to develop drag, whereas Ban contemplates the use of two separate stacks of washers on which the separate actuating structure operates. Accordingly, the inventive structure is simpler than the Ban structure.

BRIEF DESCRIPTION OF THE DRAWINGS

FIG. 3 is a sectional view of a keyed connection between a drag driver on the drag applying structure and a reel shaft along line 3—3 of FIG. 2;

FIG. 4 is a sectional view of the connection of a slider on the drag applying structure for movement lengthwise of the reel along line 4—4 of FIG. 2;

FIG. 5 is a fragmentary perspective view of a keyed connection for an operating lever for the drag applying structure;

FIG. 6 is a graph plotting actuator rotation versus drag to demonstrate rate of change using separate drag actuating structure as contemplated by the invention; and FIG. 7 is a graph plotting actuator rotation versus drag with the separate drag actuating structures used in combination.

DETAILED DESCRIPTION OF THE DRAWINGS

Figure 1:
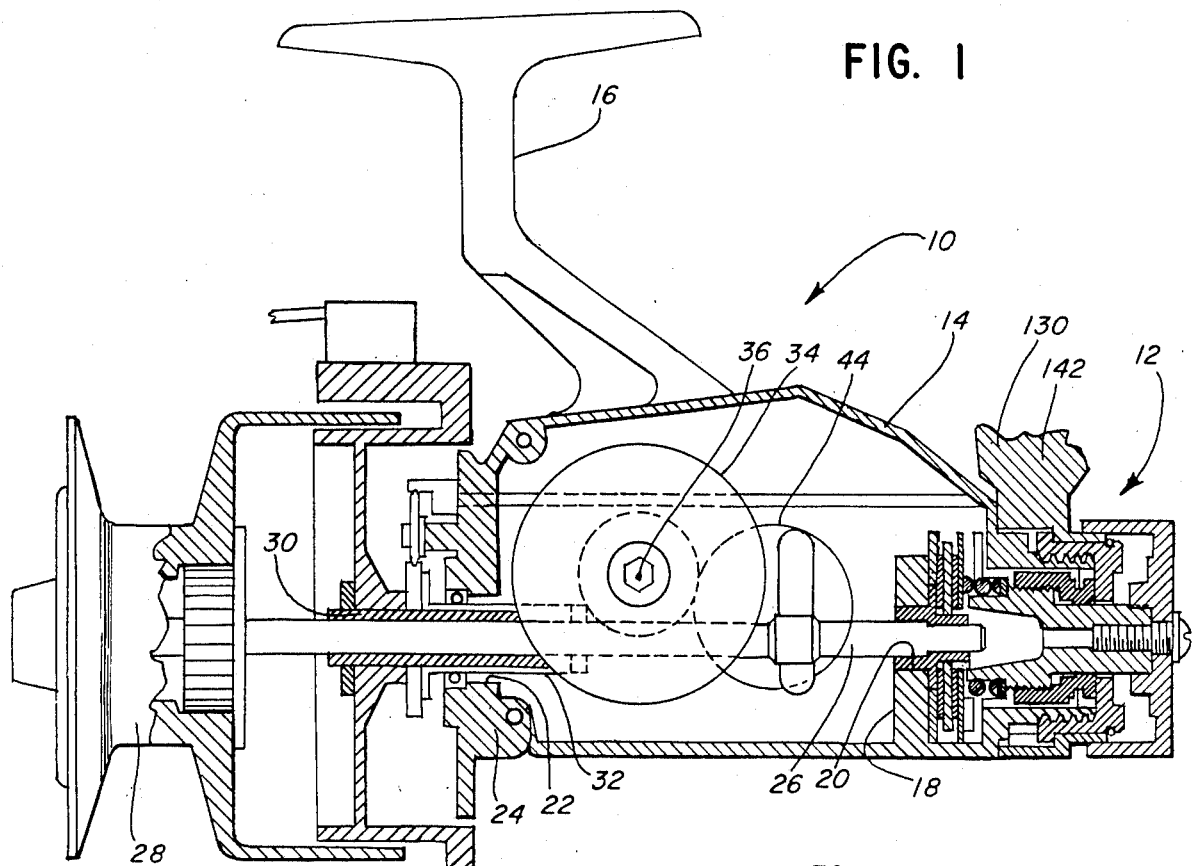
FIG. 1 is a sectional view of a reel incorporating a drag applying structure according to the present invention.
Figure 2:
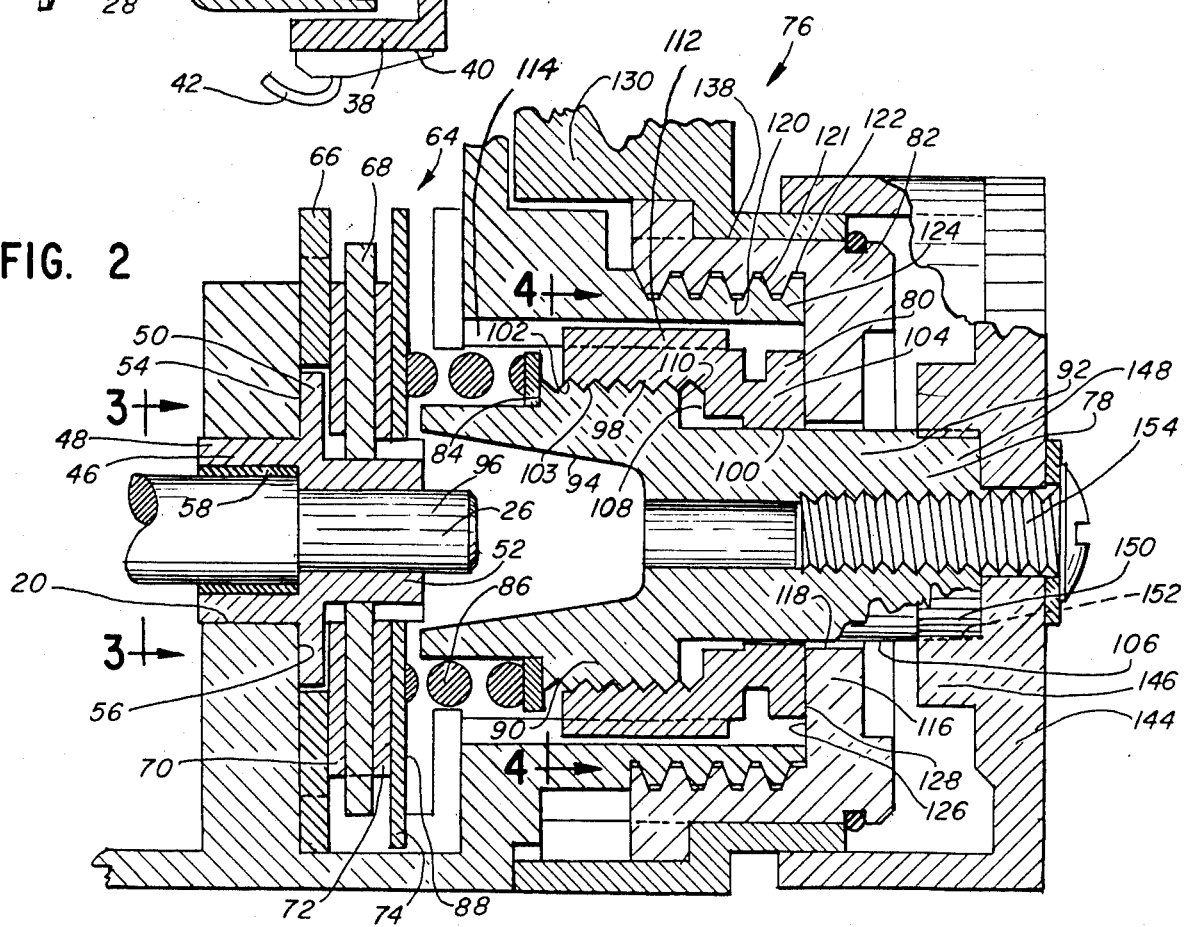
FIG. 2 is an enlarged sectional view of the drag applying structure in FIG. 1.

An exemplary reel suitable for incorporation of the present invention is shown generally at 10 in FIG. 1. The disclosed reel is a spinning style reel, however, it should be understood that the invention comtemplates incorporation into other types of reels, i.e. spin cast, casting etc. The inventive drag structure is incorporated at the rear of the reel generally at 12 in FIG. 1.

Generally, the operation of the reel in FIG. 1 is as follows. The reel has a hollow housing 14, to contain the operating mechanism, and an integrally formed mounting foot 16, through which connection is established between the reel and a rod (not shown). The housing has an integrally formed partition 18 at the rear thereof. The partition has a bore 20 which is axially aligned with a bore 22 in the front wall 24 of the housing. A spool shaft 26 extends lengthwise of the reel housing through each of the bores 20,22 and is supported therein for rotation and for lengthwise shifting relative to the housing. A line-carrying spool 28 is carried at the forward portion of the spool shaft 26.

A drive shaft 30 is journaled for rotation in the forward bore 22 of the housing and has a through bore for closely, slidably accepting the spool shaft 26. The drive shaft 30 has an associated pinion gear 32 which is in mesh with a gear 34 rotated by an operating handle (not shown) about an axis 36 transverse to the length of the reel housing and drive shaft rotational axis. As the reel is operated through the handle by a user, the drive shaft 30 rotates a head 38 with an associated bail 40. A bail arm 42 directs line onto the spool 28 as the handle is operated. As the handle is operated, a reciprocating mechanism 44 moves the shaft 26 and the spool 28 back and forth so that the line is evenly directed onto the spool.

The details of the inventive drag assembly 12 are shown clearly in FIGS. 2-5. At the rear of the spool shaft 26 is mounted a drag driver 46. The drag driver 46 has a forward cylindrical portion 48, which mates closely within the partition bore 20 for rotation therein. The drag driver has an annular flange 50, axially between the cylindrical portion 48 and a reduced diameter cylindrical portion 52. The flange 50 has a forwardly facing wall 54 which bears against the rearwardly facing wall 56 of the partition 18.

A guide sleeve 58 having two oppositely facing flats 60, extends rearwardly through the drag driver 46 and is keyed thereto. The spool shaft 26 has flats 62, which key it for rotation with the sleeve 58 so that the drag driver, sleeve 58 and spool shaft 26 rotate as a unit.

A drag washer stack 64 is carried by the drag driver behind the partition wall. The washer stack 64 comprises a washer 66 surrounding the flange 50 of the drag driver and keyed to the housing against rotation relative thereto. Washer 68 is keyed for rotation with the drag driver and is at the same time slidable in a fore and aft direction on the cylindrical portion 52 of the drag driver. Washer 70 resides between the washers 66,68, while washers 72,74 reside against each other rearwardly of the washer 68. The washers are arranged on the drag driver so that they facially engage one another to develop friction, the magnitude of which depends upon the force with which they are biased against each other and the partition wall 56. The cooperating rear wall 56 of the partition, drag driver and washer stack 64 comprise the friction generating structure on the drag assembly. The friction produced and thereby the amount of reel drag is dictated by the drag applying structure at 76.

The drag applying structure 76 comprises a drag screw 78, slider 80 and drag seat 82. The drag screw has an annular, peripheral undercut 84 which seats a coil spring 86 that is biasably, captively maintained between the rear face 88 of the rearwardmost washer 74 and the drag screw 78. Forward urging of the drag screw increases the friction between the elements of the friction generating structure to increase the resistance to rotation of spool shaft 26 which occurs with the reel in a retrieve mode as line is being drawn off of the spool.

The drag screw has a stepped, cylindrical configuration with a first diameter portion 90 and a reduced diameter portion 92 rearwardly thereof. The drag screw is coaxially arranged with the spool shaft 26 and has a tapered, forwardly opening cavity 94 which accommodates reciprocation of the free, rearward end 96 of the spool shaft 26.

The slider 80 has a stepped inside surface with a first diameter portion 98 and a reduced diameter portion 100. The slider is assembled relative to the drag screw by moving the slider over the reduced diameter portion 92 of the drag screw to present the drag screw portion 90 at the front opening 102 of the slider. The drag screw portion 90 is externally threaded and mates with threads 103 on the inside surface portion 98 of the slider. The slider and drag screw are thus connected for relative axial movement relative to the shaft 26.

The reduced diameter surface 100 at the rear portion 104 of the slider is guided over the outer surface 106 of the reduced diameter portion 92 of the drag screw as the slider and drag screw are assembled. Forward movement of the slider relative to the drag screw is limited by a forwardly facing shoulder 108 on the slider which abuts a rearwardly facing shoulder 110 on the drag screw with the slider in its forwardmost position. Nonrotatable, fore and aft movement of the slider is guided by four lengthwise ribs 112 thereon, each having a substantially rectangular cross-section, which ribs move in cooperating lengthwise guide grooves 114 in the reel housing 14.

The drag seat 82 has a generally cup-shaped configuration and opens forwardly of the reel. The rear wall 116 of the seat 82 has a bore 118 to accept the reduced diameter portion 92 of the drag screw so that the drag screw and seat can be placed in axially overlapping relationship. An inside, cylindrical surface 120 of the seat is threaded to mate with threads 121 on the outer surface 122 of a cylindrical, rearwardly projecting portion 124 of the housing. Threading the seat forwardly brings a forwardly facing surface 126 to bear against a rearwardly facing surface 128 on the rear portion 104 of the slider. The bias of spring 86 maintains the surfaces 126,128 against each other.

It can be seen that rotation of the seat 82 in one direction moves the slider and drag screw, which is threaded thereto, in a forward direction against the bias of spring 86 to bear with increasing force against the washer stack 64. The drag screw 78 can itself be rotated relative to the slider, also in a first direction of rotation, to increase the drag force. Consequently, rotation of either the drag seat or drag screw will increase the reel drag.

According to the invention, the pitch of the cooperating threads on the drag seat 82 and housing 14 is greater than the pitch of the cooperating threads on the drag screw 78 and slider 80. Accordingly, rotation of the seat will produce a greater rate of drag change than will rotation of the drag screw. One therefore has the option of using one or the other of the drag actuating seat and drag screw, depending upon the rate of drag change that is desired.

To facilite rotation of the drag seat 82, a radially projecting drag lever 130 is provided. The drag lever, as seen in FIG. 5, has an associated mounting body 132 with rectangular cutouts 134. The body 132 has an inside surface 136 which fits closely over the outside surface 138 of the drag seat. Projections 140 are provided on the outside surface 138 of the seat and are slid into the cutouts 134 to make keyed connection between the drag seat and lever 130. The lever 130, as seen clearly in FIG. 1, has an enlarged head 142, which can be readily engaged by a user.

Rotation of the drag screw is facilitated by providing a cup-shaped drag knob 144 at the rear of the reel. The drag knob 144 has an internal annular boss 146, which fits over the free end 148 of the drag screw. The free end 148 has splines 150 which cooperate with splines 152 on the knob 144 to prevent relative rotation between the knob and drag screw. A bolt 154 secures the connection of the drag knob and drag screw. The outer surface of the knob is knurled to facilitate turning thereof by the user.

The advantages of the inventive structure are demonstrated graphically in FIGS. 6 and 7. FIG. 6 shows the relative rate of change of the drag resistance achieved through adjusting separately each of the drag lever and drag knob from a no drag condition.

FIG. 7 demonstrates how the drag actuating knob and lever can be used together. For example, the drag adjustment lever can be set at a medium or mid-range setting. The drag knob is then adjusted to the nominal desired drag setting shown as point A. The lever adjustment starts at point A.

Rotating the drag adjustment lever to increase the drag results in a rate of change as shown on line A-B. If the drag adjustment lever is rotated to decrease the drag resistance, the decrease is at the same rate of change as the increase and is as indicated on line A-C. The exact initial setting may be obtained by returning the lever to its original position. Lever 138 may be set at maximum, minimum or at any setting therebetween at the start of the drag setting of the knob.

Alternatively, if the lever is set at a minimum setting and the drag knob is set to obtain a drag setting as shown at point D, rotation of the knob can only increase the drag resistance as shown in line D-E.

It can be seen that the inventive structure is simple, yet extremely versatile. Further, assembly of the drag structure is facilitated. With the washer stack 64 assembled, one can put in place the drag screw with the associated slider and spring. The seat with the lever in place thereon is then screw-threaded in place and thereby holds in captive relationship the slider, drag screw and spring. The drag knob 144 can then be bolted into place to complete assembly.

It should be understood that the foregoing detailed description was made for purposes of demonstrating an exemplary structure incorporating the invention and its operation, with no unnecessary limitations to be understood therefrom.

I claim:

1. In a fishing reel of the type having a housing, a line-carrying spool which is rotatable upon line being drawn off of the spool with the reel in a retrieve state, friction generating structure that is rotatable with said spool and drag applying structure for biasably engaging the friction generating structure to produce a drag force that resists rotation of the spool, improved drag actuating structure for biasably urging the drag applying structure against the friction generating structure, said drag actuating structure comprising:
    a drag seat having an actuating lever connected thereto;
    a drag screw;
    first means threadably connecting the drag seat to the housing for rotation of the drag seat relative to the housing for movement of the drag seat towards and away from the drag applying structure at a first rate;
    a non-rotatable slider separate from the drag screw and drag seat;
    means mounting the slider for sliding movement relative to the housing towards and away from the drag applying structure;
    means for biasing the slider means at all times against the drag seat and away from the drag applying structure so that the slider follows movement of the drag seat towards and away from the drag applying structure; and
    second means threadably connecting the drag screw to the slider for rotation relative to the slider for movement of the drag screw relative to the slider towards and away from the drag applying structure at a second rate that is different than the first rate,
    whereby a user of the reel can selectively rotate the drag seat relative to the housing and the drag screw relative to the slider to change overall reel drag at a desired rate.

2. The fishing reel according to claim 1 wherein the first and second rates are constant and the first rate is greater than the second rate.

3. In a fishing reel of the type having a housing, a line-carrying spool which is rotatable upon line being drawn off of the spool with the reel in a retrieve state, friction generating structure that is rotatable with said spool and drag applying structure for engaging the friction generating structure to produce a drag force that resists rotation of the spool, improved drag actuating structure for biasably urging the drag applying structure against the friction generating structure, said improved drag actuating structure comprising:
    a drag seat;
    cooperating threads of a first pitch on the drag seat and housing,
    said drag seat being rotatable relative to the housing about a first axis to effect shifting of the drag seat relative to the housing selectively in opposite directions along the line of the first axis towards and away from the drag applying structure;
    a slider;
    means for guiding translatory movement of the slider relative to the housing along the first axis and for preventing relative rotational movement between the housing and slider about said first axis;
    means for biasing the slider at all times against the drag seat and away from the drag applying structure so that the slider follows movement of the drag seat towards and away from the drag applying structure;
    a drag screw; and
    cooperating threads of a second pitch different than the first pitch on the drag screw and slider,
    said drag screw being rotatable relative to the slider about said first axis to effect shifting of the drag screw relative to the slider selectively in opposite directions along said first axis towards and away from the drag applying structure,
    said drag screw being selectively movable towards and away from said drag applying structure along said first axis both upon rotation of the drag seat relative to the housing and upon rotation of the drag screw relative to the slider,
    the pitch of the first and seconds threads being different so that the rates of change of drag force effected by rotation of the drag seat relative to the housing and the drag screw relative to the slider are different.

4. The improved fishing reel according to claim 3 wherein said drag screw has a cylindrical body portion and an annular undercut defining a surface and the biasing means is interposed between the drag applying structure and the drag screw surface defined by the undercut.

5. The improved fishing reel according to claim 4 wherein the biasing means comprises a coil spring which surrounds a portion of the drag screw.

6. The fishing reel according to claim 3 wherein the first and second rates are constant and the first pitch is greater than the second pitch.

* * * * *